United States Patent [19]

Aylmer et al.

[11] 4,073,157
[45] Feb. 14, 1978

[54] OFFSHORE METHOD

[75] Inventors: Norman Noel Aylmer, Cherhill, near Calne; Peter Coe; John Graham Watson, both of London; Brian Percy Holloway, Epsom, all of England

[73] Assignee: Piccal Subsea Limited, London, England

[21] Appl. No.: 735,543

[22] Filed: Oct. 26, 1976

[51] Int. Cl.² .............................................. F16L 1/04
[52] U.S. Cl. ........................................ 61/111; 285/18; 285/367; 285/332.2; 285/403
[58] Field of Search ................... 61/110, 111, 107, 105, 61/63, 108, 109, 112

[56] References Cited

U.S. PATENT DOCUMENTS

| 580,226 | 4/1897 | Sanford | 61/111 |
|---|---|---|---|
| 3,729,941 | 5/1973 | Rochelle | 61/110 |
| 3,834,169 | 10/1974 | Abbott | 61/111 |
| 3,978,677 | 9/1976 | Lochridge | 61/108 |
| 3,982,776 | 9/1976 | Payne | 61/110 |

FOREIGN PATENT DOCUMENTS 1,116,757   6/1968   United Kingdom ............. 61/107

Primary Examiner—Paul R. Gilliam
Assistant Examiner—A. Grosz
Attorney, Agent, or Firm—Diller, Brown, Ramik & Wight

[57] ABSTRACT

A method of depositing pipe on the seabed which includes providing a vessel of a length greater than the pipe, which vessel has a main winch on one end and an auxiliary winch on the other end, anchoring a cable from the main winch to the seabed, drawing the cable horizontally of the vessel utilizing the auxiliary winch, attaching trolleys carried by a length of pipe to the section of the cable overlying the vessel, using the auxiliary winch to let out the cable and suspend the pipe on the cable from the main winch, utilizing a third cable to lower the pipe, and repeating the process for each length of pipe.

5 Claims, 9 Drawing Figures

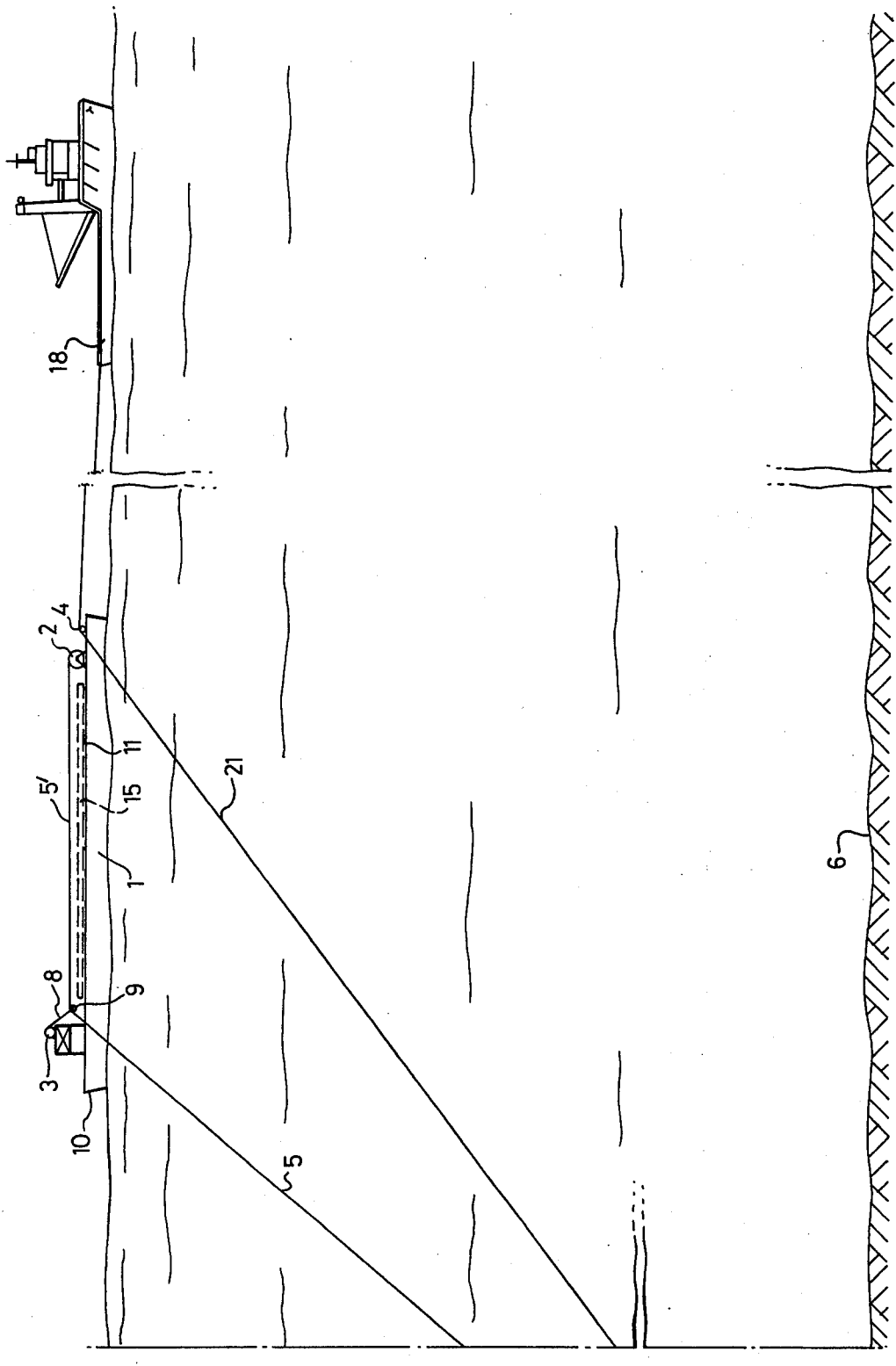

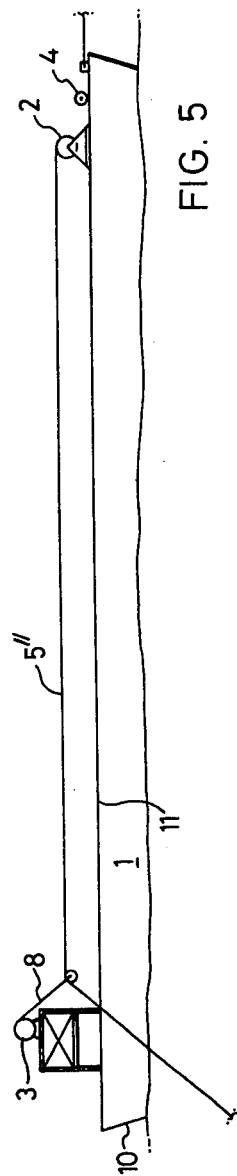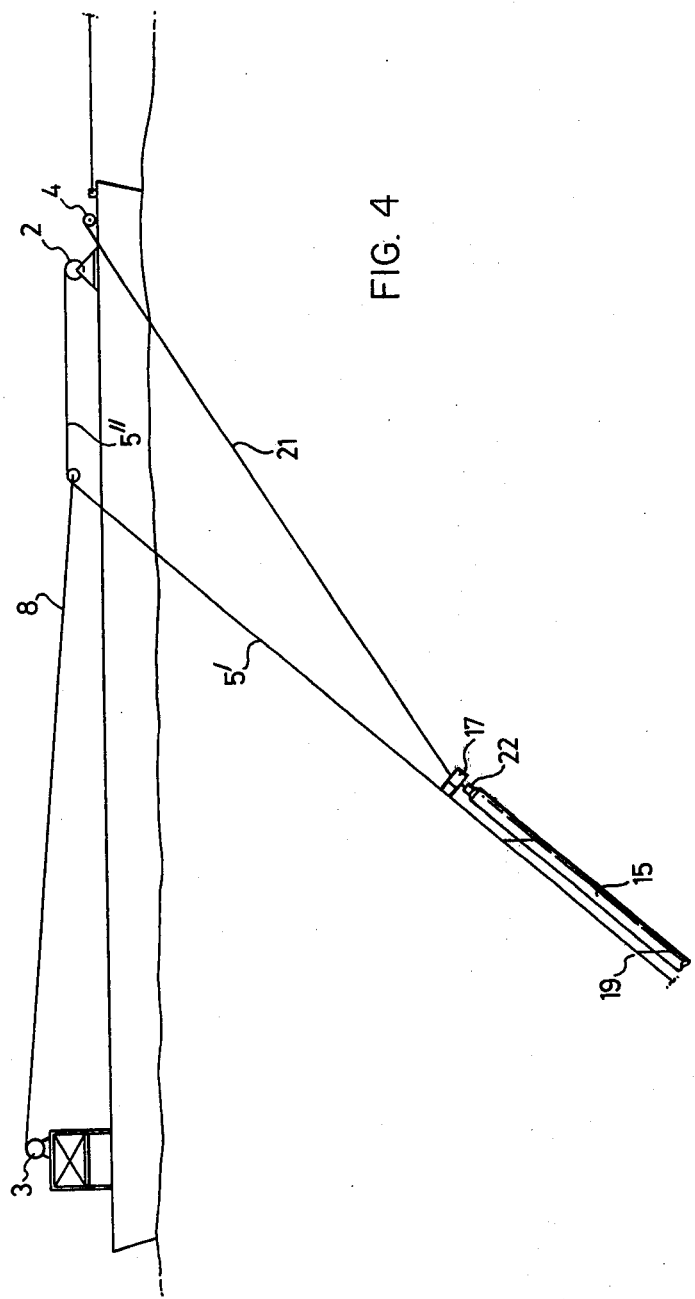

OFFSHORE METHOD

The present invention relates to subsea pipelines useful in the production and transfer of fluid minerals such as oil or any other pumpable material, e.g., ore slurry, requiring to be carried across a sea bed. More particularly the invention relates to a method of laying such a pipeline.

The invention is especially applicable to situations calling for subsea pipelines to be laid at greater depths than hitherto, or under difficult or adverse conditions such as are met with in the North Sea. In the past it has been the practice to lay subsea pipelines from a lay barge by welding sections end to end on the barge and passing the pipeline formed down a ramp or 'stinger' as the barge moves forward. Such a procedure involves obvious disadvantages particularly with regard to limitations of sea depth and pipe diameter, and the need to employ divers and use underwater welding techniques in practice to complete or repair the pipeline.

It is an object of the invention to provide a novel system for laying and connecting pipelines under water at any depth, without the need of divers and without underwater welding.

The proposed method involves relatively rapidly stringing out the pipe in lengths on the sea bed in a manner not critically dependent on weather conditions. Submersible craft may be used to complete the alignment of the strung out pipes and to couple them together by means of a mechanical joint.

According to the present invention we provide a method of laying out lengths of subsea pipeline in sequence on the sea bed by lowering the lengths severally to the sea bed from a surface vessel down an anchored cable suspended from the vessel. More specifically we provide such a method wherein a step in laying each length of pipe comprises transferring the length from a position in which it is supported along the vessel, by lowering one end of the length, to a sloping position in which it is suspended in the water along the anchored cable, in a more or less catenary attitude.

According to an embodiment of the present invention we provide a method of laying out lengths of subsea pipeline in sequence on the sea bed by lowering the lengths severally to the sea bed from a surface vessel down an anchored cable wound on a first winch on board the vessel, which method comprises:

(a) attaching to a point on the anchored cable adjacent said first winch the free end of a first auxiliary cable which is wound up on a second winch horizontally separated from the first winch by at least a distance substantially equal to a length of the pipe to be laid;

(b) paying out anchored cable from the first winch while winding said first auxiliary cable on the second winch, to move said point of attachment along the vessel for a distance equal to said length of pipe to be laid;

(c) hanging along the anchored cable between said point and the first winch travelling supports carrying the length of pipe to be laid and attaching to the length of pipe a second auxiliary cable wound up on a third winch;

(d) paying out the first auxiliary cable and thereby lowering to a position hanging from the first winch, the anchored cable with the length of pipe supported therealong above said point of attachment;

(e) detaching the first auxiliary cable from the anchored cable and the paying out the second auxiliary cable, thereby lowering said supported length of pipe down the anchored cable to a position adjacent the anchor point or the next previously lowered length of pipe in the sequence;

(f) repeating steps (a) to (e); and moving the vessel forward along the direction of the pipeline for a distance equivalent to the lengths of pipe laid.

Preferably the lengths of pipe, before laying, are adapted for mating adjacent lengths in line by fixing to the respective ends of each length a male coupling member and a female coupling member capable of mating with such a male coupling member, optionally with the aid of sealing rings, to form a sealed junction. The male and female coupling members may be automatically locked together when mated, as by means of external spring-loaded catches fastened to the female coupling member and a co-operating shoulder on the male coupling member. The lengths of pipe may be fitted with external lugs to facilitate lifting.

After the sequence of pipe lengths has been laid out on the sea bed as nearly as possible in line, the lengths may be linked together to form a connected pipeline. The couplings may be sealed as fluid-tight pipe connections by injecting sealant material between opposing surfaces of the coupling members through an opening in the female member, the egress of sealant material being limited by sealing rings.

According to a preferred embodiment, at least one self-propelled submersible craft equipped with means for handling lengths of pipe is employed at the sea bed to lift, align and couple each length of lowered pipe in turn with the next pipe in the sequence and leave a completely connected string of pipes on the sea bed.

Generally, the lengths of pipe will be conventionally fabricated of material suited to submarine conditions, including deep sea conditions, of similar dimensions to one another, and weighted by coating with concrete.

The surface vessel may be a pipe-carrying barge, self-propelled or moved by towing or winching, headed in the direction of the projected pipeline, and loaded with a supply of pipelengths. The anchored cable should preferably be anchored at a point on the sea bed on the line of the pipeline and aft of the vessel, to facilitate the laying of the lengths in positions leaving the minimum of pipe alignment to be carried out in connecting the lengths together. The anchoring means may be an actual anchor or may be provided by attachment to previously laid lengths of pipe or cable. The first winch on board the vessel, i.e., the winch on which the anchored cable is wound, should normally be forward of the second winch whereby the winching operation of step (b) above moves the said point of attachment aft in relation to the vessel, from the first winch to the second winch.

It is advantageous to move the vessel forward along the direction of the pipeline for a distance equal to the pipe to be laid, during step (b), so that the said point of attachment remains substantially stationary with respect to the sea bed. The intervals at which the vessel is moved forward in relation to the lengths of pipe laid, may, however, be varied to suit the loading circumstances on the anchored cable. In step (c) the length of pipe may be hung on the anchored cable by a number of slings, arranged to depend from the horizontally disposed anchored cable suspended between the first and second winches, the slings being adapted to travel down the cable under gravity.

At the point of attachment of the anchored and first auxiliary cables, i.e., at the initially lowered end of each individual length of pipe, detachable means which may be remotely controlled is provided to prevent the length of pipe from proceeding further down the anchored cable while the attachment persists. When the first auxiliary cable has been detached from the anchored cable, the latter hands suspended between the first winch and the effective anchorage point at the sea bed carrying one or more lengths of pipe along it, in what may loosely be termed a catenary position.

The third winch, on which is wound the second auxiliary cable for lowering down the anchored cable the length of pipe supported thereon, is preferably mounted on the vessel in the proximity of the first winch, which represents the point of suspension of the anchored cable supporting the length of pipe when the third winch is paying out. The second auxiliary cable is attached to the supported length of pipe, if desired, by remotely controlled detachable means, preferably at the end of the length nearest the first winch.

The first and last lengths of a pipeline to be laid may be so laid by an adaptation of the method of the invention, and the procedure of the invention is repeated sufficiently to lay the lengths between. The result is a sequence of pipe lengths resting on the sea bed approximately in line retained by the anchored cable ready for connection into a completed string. In preferred embodiments the lengths are provided with automatic couplings, fitted e.g., by welding, whereby in principle it only remains to align the lengths and bring them together end to end to complete the pipeline. In practice a buffer of shock absorbent material heavier than water is slung on the anchored cable or carried on a coupling member, between each length of supported pipe to prevent collision damage to the pipe ends and requires to be removed before the pipes are coupled.

As already indicated, the operations necessary to complete the laid pipeline which may include sealing the joints and disposing of or retrieving cables, buffers and other accessories, can be performed by a suitably equipped submarine, capable of operating at the maximum depths encountered and for a sufficiently long tour of duty for instance at depths of many hundreds of feet and for a matter of weeks.

The invention will now be further described by way of illustration with the aid of the accompanying drawings, wherein:

FIGS. 1a and 1b are a general illustration of the pipe laying method of the invention;

FIGS. 2 to 5 depict a sequence of four steps in pipe laying by the method of the invention;

In an example of the method of the invention, illustrated in the above-mentioned Figures, 60-meter lengths of steel pipe are preformed by welding together 5 × 12-meter lengths, coated with a protective layer against corrosion, and then weightcoating them with concrete. A 36-inch diameter pipe will therefore weigh approximately 63 tons in air and 46 tons when immersed in sea water. A stock of lengths of the pipe is loaded onto a barge and towed out to location. Lengths of pipe of other dimensions, for instance, 60-inches in diameter, may be used.

Figure 1B:
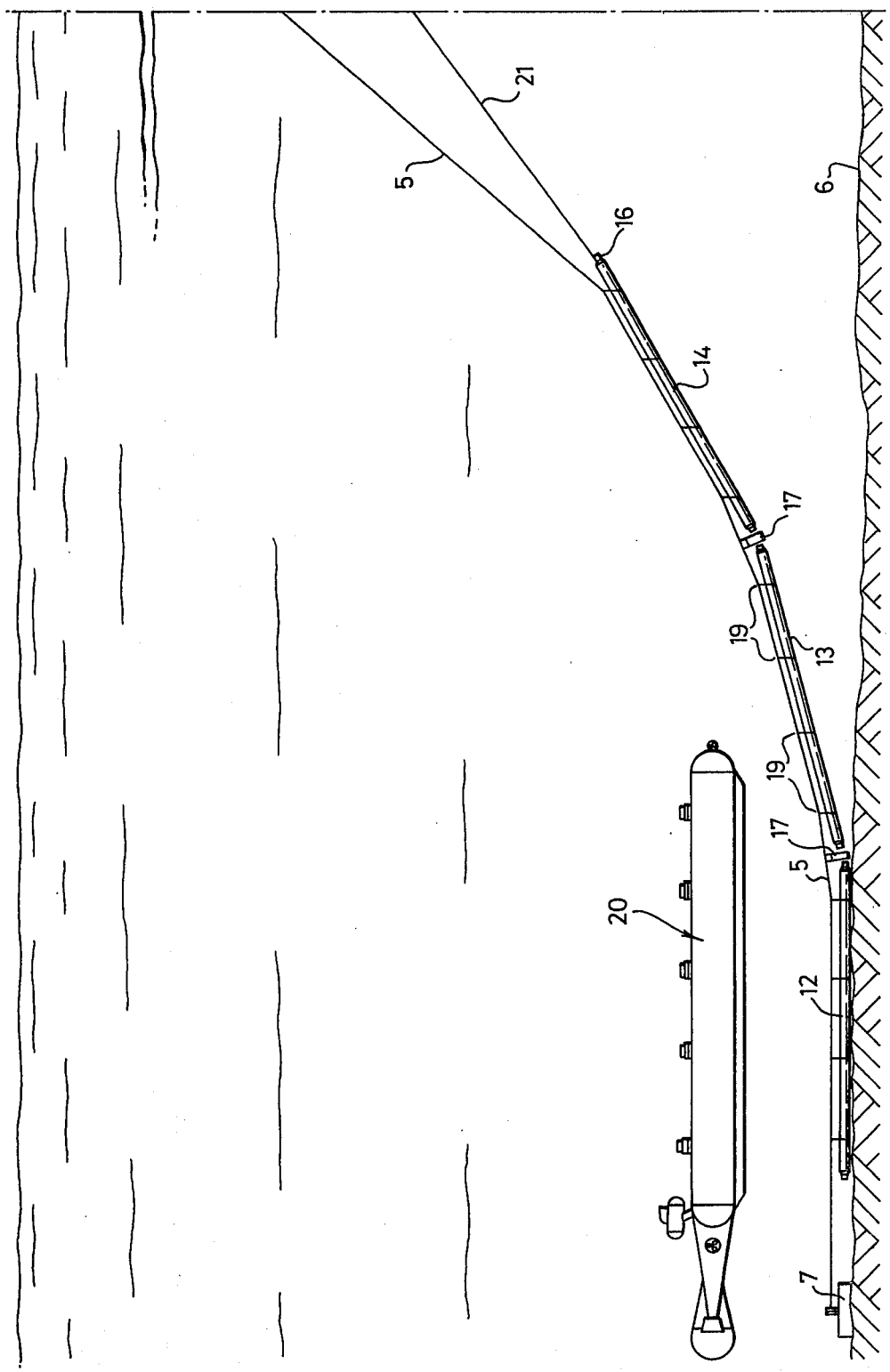

Referring to FIGS. 1a and 1b there is shown a barge 1 towed by a tug 18 and equipped with a main cable winch 2, an auxiliary winch 3 and a lowering winch 4. A steel cable 5 from the main winch is anchored to the sea bed 6 by an anchor block 7 at the start of the pipeline. A secondary cable 8 from the auxiliary winch 3 is attached to the main cable 5 for instance by a hydraulic stopper 9 and used to transfer the point of suspension at 9 from the main winch towards the stern 10 of the barge. In this way a horizontal length 5' of cable 5 is provided just above the barge deck 11 and a 60-meter pipe length 15 is ready to be hung along the length of cable by means of "travellers" 19 (see FIG. 6) riding on the cable and attached to slings or hooks to carry the pipe length bodily or by means of fitted or integral lugs on the pipe. A line 21 from the lowering winch 4 is shown still attached to the forward end 16 of the previous length 14 of the series of pipe lengths 12, 13, 14, lowered to the sea bed on cable 5, buffers 17 being fitted to the end of each successive pipe length. A submarine 20 is shown in attendance for completing operations at the sea bed.

Figure 2:
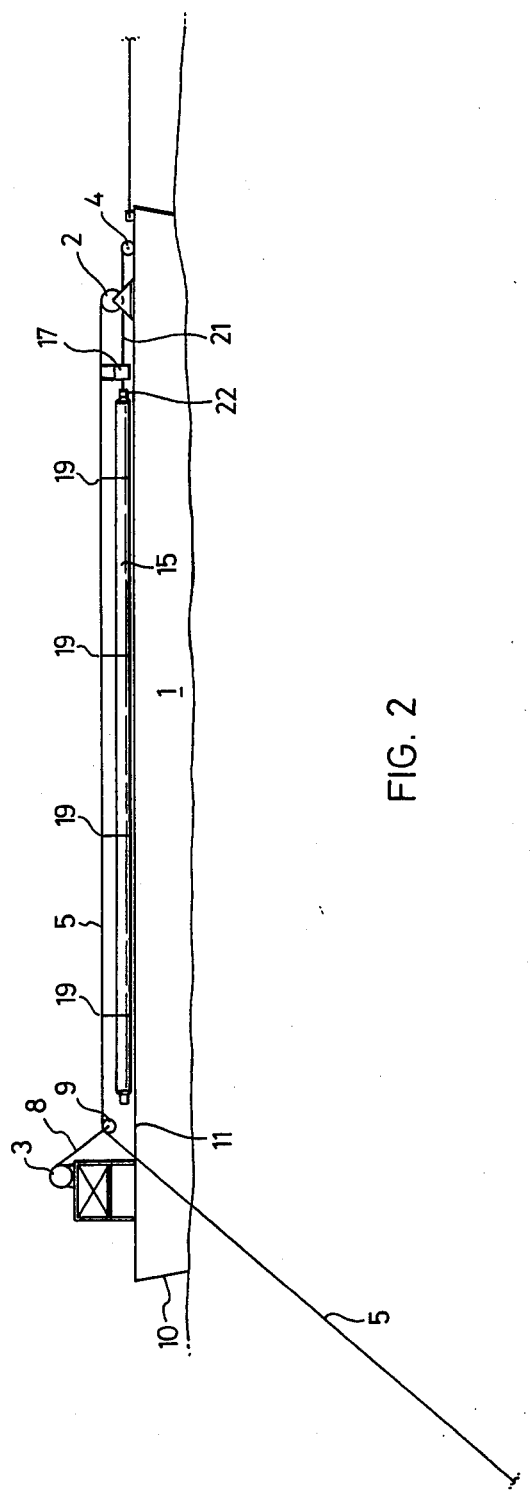
Figure 3:
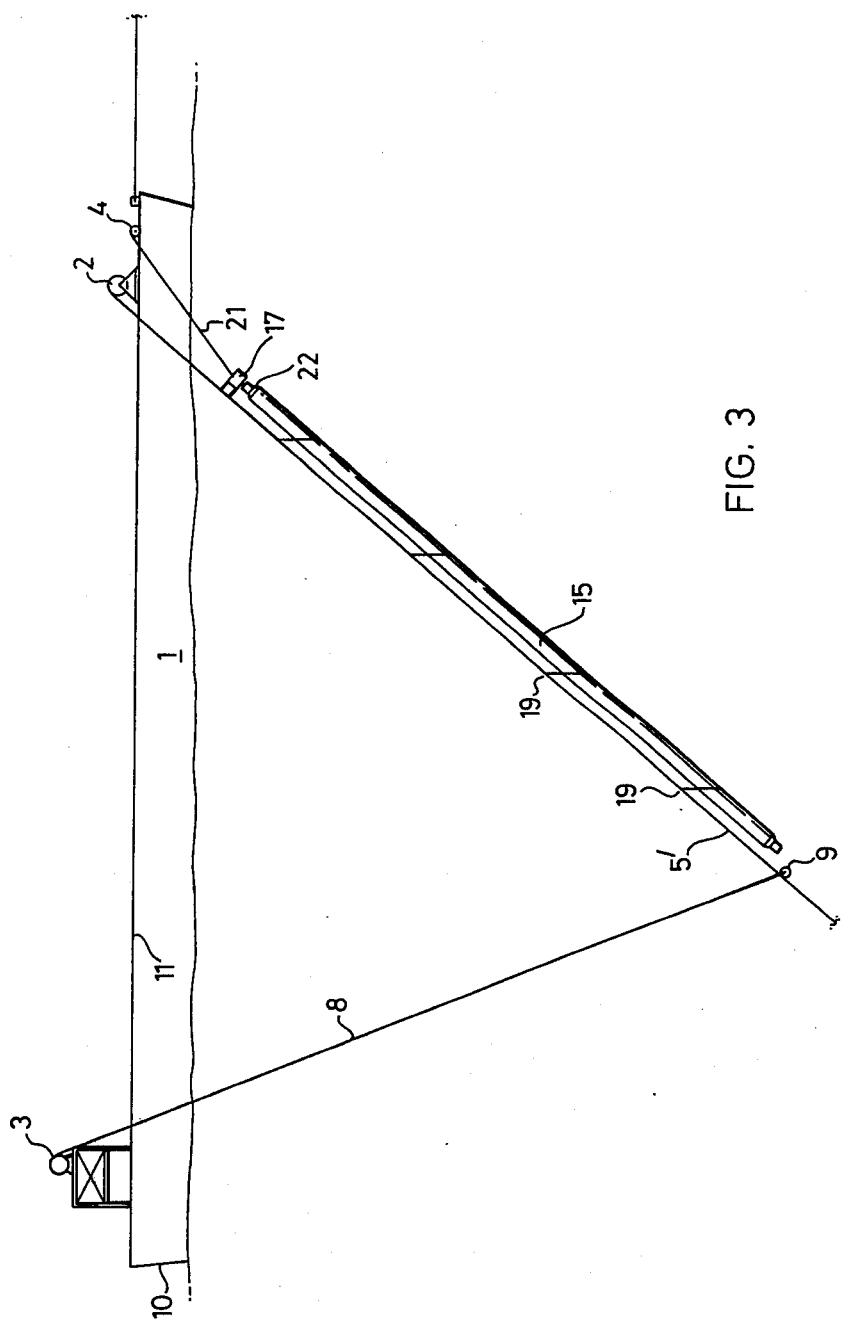

Referring now to FIGS. 2 to 5 in which similar apparatus is shown, and first to FIG. 2, the line 21 from the lowering winch 4 is attached to the forward end 22 of the pipe length 15 on the deck 11. Cable 5' carries the pipe length 15 slung from travellers 19, and a buffer 17 is also slung onto the cable 5', to be fitted to the forward end 22 of the pipe length 15 to act as a protector to the end of the next pipe in the sequence. As shown in FIG. 3 the auxiliary winch cable 8 is next paid out, thus allowing the main cable 5' to sag into the water until hanging directly from the main winch 2 at an angle due to the anchorage 7 of the cable 5. The auxiliary cable 8 is then automatically detached from the main cable at 9 and retrieved. Referring to FIG. 4 pipe length 15 is lowered by cable 21 down to the main cable 5 to the sea bottom. The auxiliary cable 8 is re-attached to the main cable close to the main winch 2 and the point of suspension 9 is transferred towards the stern 10 by winding in the auxiliary cable 8 and paying out the main cable 5", and moving the barge 1 forward as necessary, until the position shown in FIG. 5 is regained ready for the attachment of the next length of pipe to the cable 5"', auxiliary cable 21 having been detached and wound up on winch 4.

Figure 6:
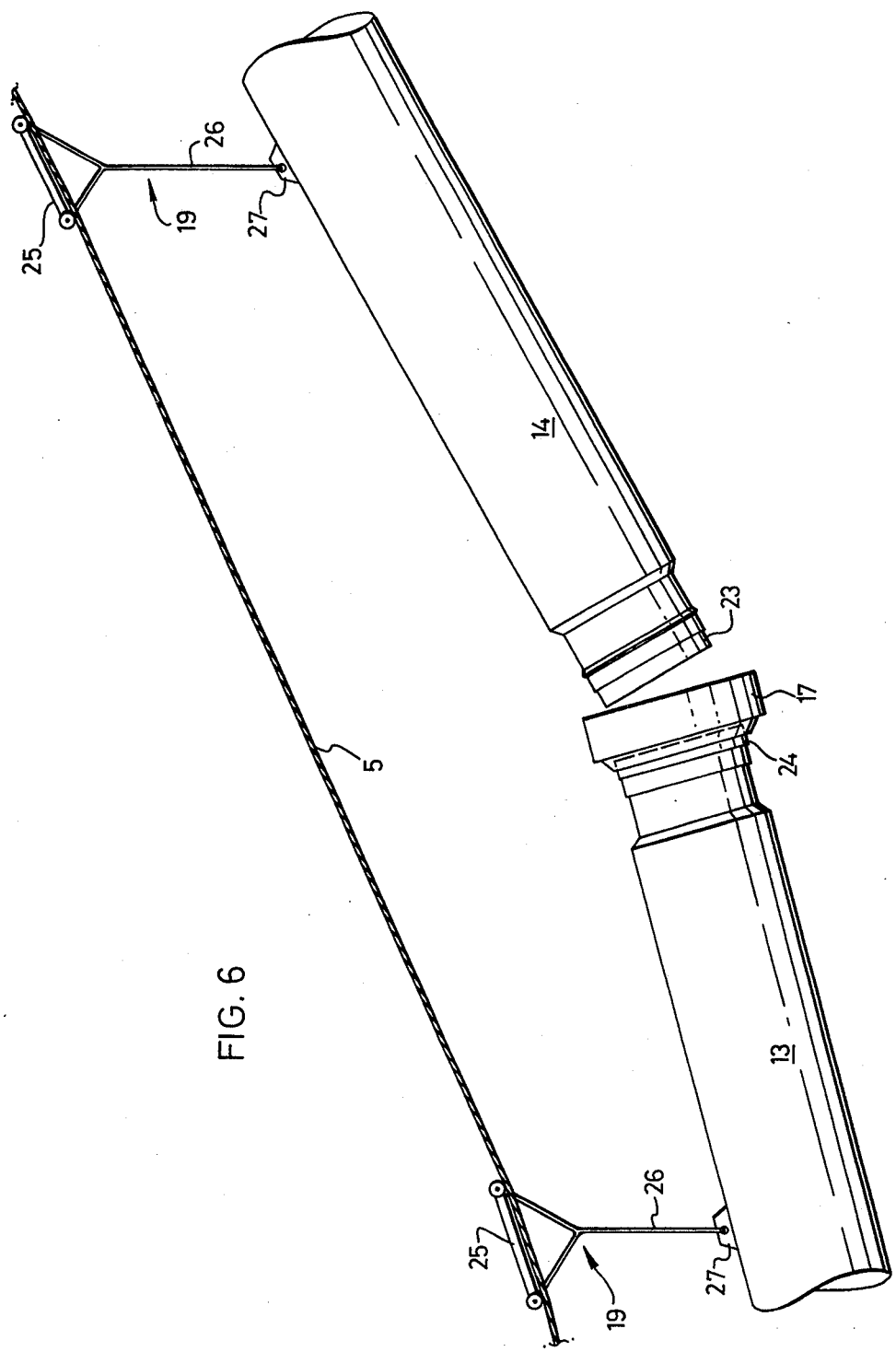
FIG. 6 shows detail of a buffer and of suspension of a length of pipe on an anchor cable.

In FIG. 6 there are shown two adjacent pipe lengths 13, 14, in the sequence depicted in FIGS. 1a, 1b to 5, having male and female coupling members indicated diagrammatically at 23, 24. The forward end 24 of length 13 is fitted with a buffer 17. Each length of pipe is slung from anchored cable 5 by means of a plurality of travellers 19 of which one is shown for each length of pipe. The travellers each comprise a slide component 25 and a hanging component 26 detachably holding a lug 27 on a length of the pipe. The pipe lengths 13, 14, are shown approximating to the position in which they are laid on the sea bed.

Subsequent lengths of pipe are lowered down the main cable in the same way, whilst the barge moves regularly forward, care being taken to ensure that the tension on the main cable is not excessive, by not allowing more than a few, say three, lengths of pipe to be supported clear of the bottom by the main cable.

The barge is re-supplied with pipe as necessary and in this way some three miles of pipe could be strung out per day. If the anchored main cable all becomes occupied by pipe lengths a fresh length can be anchored at or by the last length laid.

Figure 7:
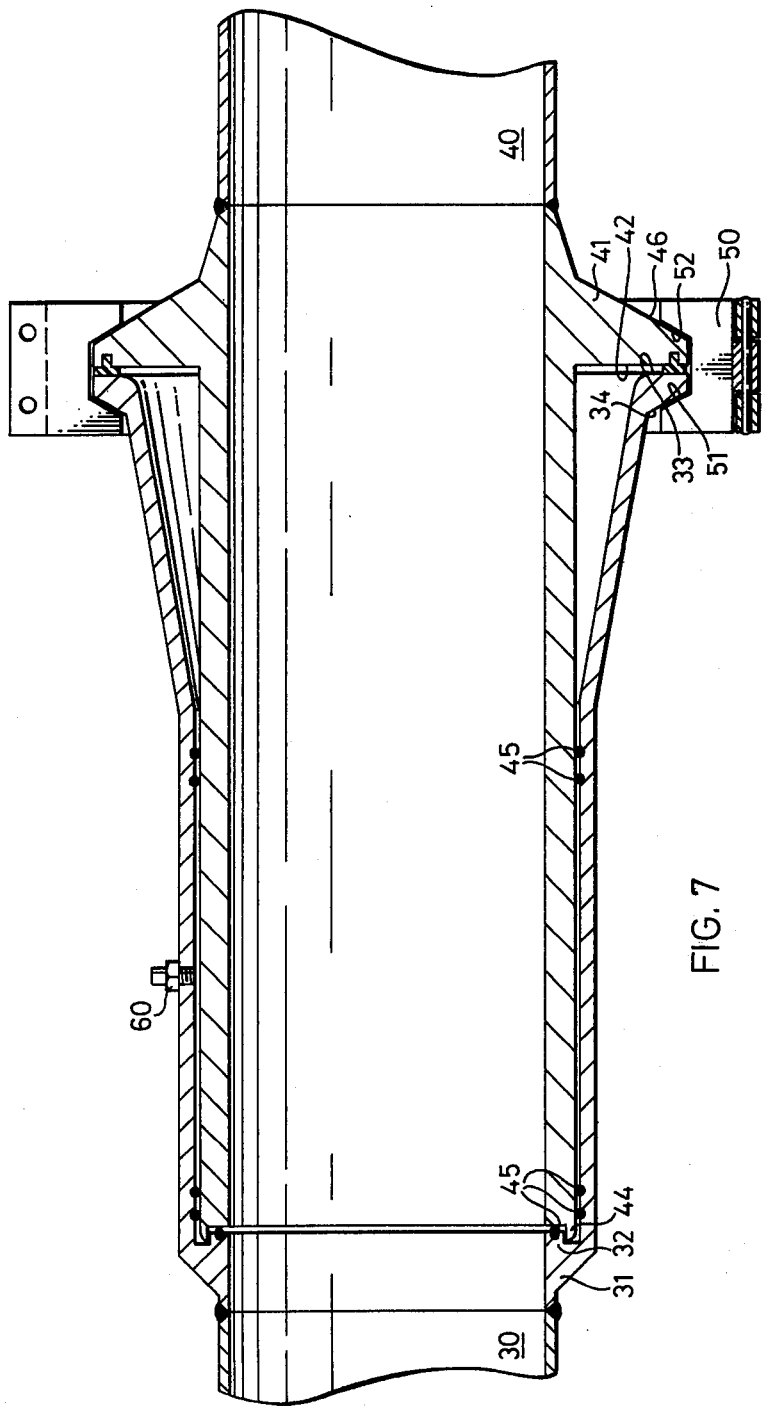
FIG. 7 shows detail of a pipe joint for use in coupling lengths of pipe laid by the method of the invention.
Figure 8:
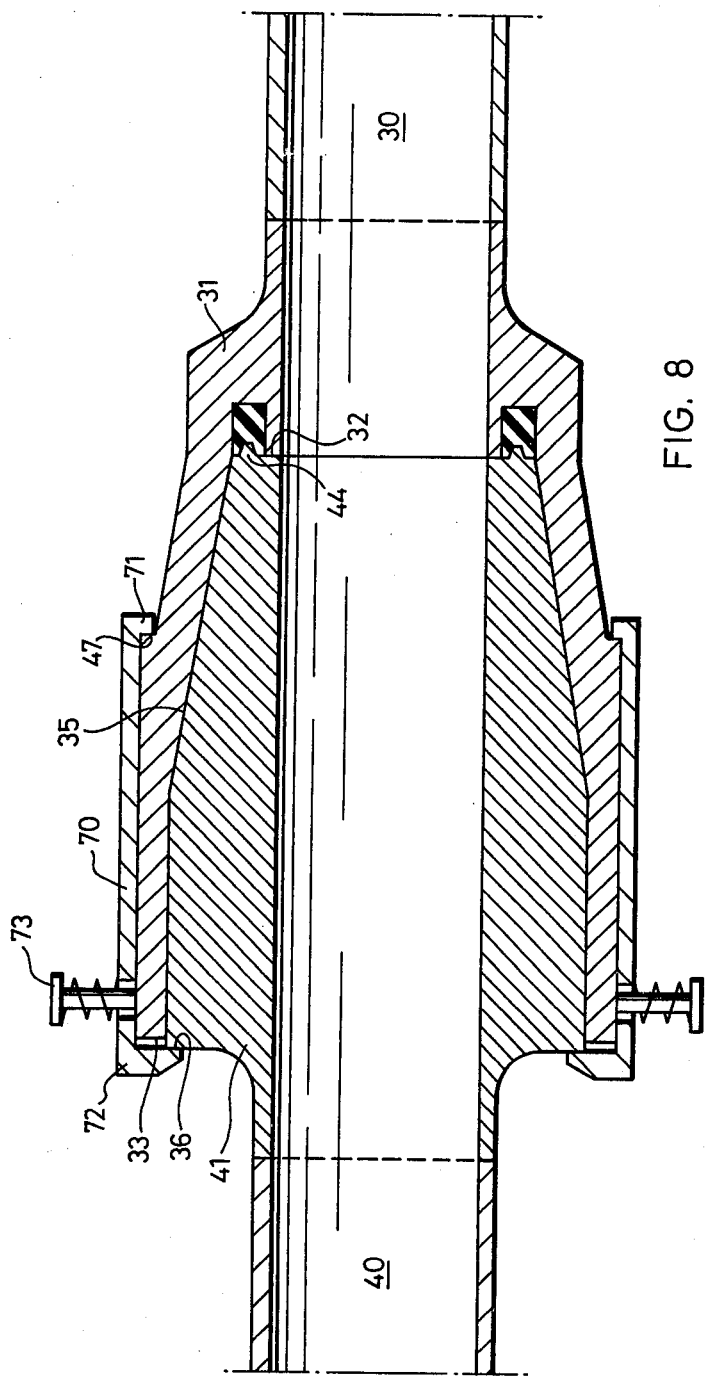
FIG. 8 shows an alternative form of pipe joint.

The pipes are connected together as they are being laid or subsequently, by means of a mechanical coupling, the concept of which is illustrated in FIGS. 7 and 8, which show two different embodiments of a coupling, each consisting of a mechanism to retain the one pipe in the other, precisely machined to give a tight fit.

In the embodiment shown in FIG. 7, one end 30 of a first length of pipe is welded to a female coupling end portion 31 which has an enlarged inner diameter leaving an annular grooved shoulder 32 and opening out lengthwise to a mouth having an annular lip 33. The end 40 of a second and adjacent length of pipe to be joined to the first, is welded to a male coupling end portion 41 having an external shoulder 42 which abuts the lip 33, resilient sealing material 43 located in the shoulder 42 providing a seal and buffer between the coupling members. The portion 41 is cylindrical and extends with a precise fit into the portion 31, a projecting annular ridge 44 mating with the groove in shoulder 32. Sealing rings 45 ensure a liquid tight and gas tight closure, the coupled joint being secured together by a clamping collar 50 having convergent inner faces 51, 52, to co-operate with faces 34, 46, on the female and male coupling portions respectively to hold the latter together.

An inlet 60 is provided in the female coupling 31 for injection of sealing resin or the like, between the faces of the coupling members intermediate the sealing rings 45.

In the embodiment shown in FIG. 8, one end 30 of a first length of pipe is welded to a female coupling end portion 31 which has an enlarged inner diameter leaving an annular grooved shoulder 32 and opening out lengthwise conically to a mouth having an annular periphery 33. The end 40 of a second and adjacent length of pipe to be joined to the first, is welded to a male coupling end portion 41 having an enlarged outer diameter near the weld, tapering at 35 to fit the female conical portion down to an annular end with a projection 44 to impinge on resilient sealing material in the groove of the shoulder 32. A plurality of spring-loaded catches 70 holds the coupled joint together by virtue of abutments 36 on member 41, 47 on member 31, and retaining flanges 72 and 71 respectively on each catch 70 which is held against the coupling by spring retainer 73. It will be apparent that the coupling is achieved by simply introducing part 41 into part 31. The catches 70 are normally in the closed position under the influence of springs 73 and open only when the male part is entering, by virtue of the sloping portion 35, after which they close again automatically when the coupling is fully shut.

Various alternatives may be adopted as long as they will withstand the pressure encountered in use. Once mated, the joints are positively locked together and the interstices of the coupling are injected with an epoxy resin to ensure a positive seal.

The coupling is effected at the sea bed automatically or for instance with the aid of a submarine which takes hold of the adjacent ends of two pipe lengths by means of any suitable device, such as a mechanical grab or hook co-operating with a lug on the pipe, then disconnects and removed the buffer from between the two pipes, lifts the two pipe ends clear of the sea bed, cleans the coupling if necessary and forces the two ends together, making the joint. If the pipe lengths are misaligned the submarine first realigns them by lifting and relowering them.

The joints are tested progressively in sections by inserting a packer in the open pipe end and pressurizing, section by section; the injection of resin into each joint to seal it permanently, follows the testing.

The pipeline may be buried after connection, by means of a jetting or cutting machine towed along the pipe, or contained within the submarine, or by drilling and blasting a trench prior to pipelaying in the case of hard rock and backfilling the trench with rocks after pipelaying.

What is claimed is:

1. A method of laying out lengths of subsea pipline in sequence on the sea bed by lowering the lengths severally to the sea bed from a surface vessel down an anchored cable suspended from the vessel, said anchored cable being wound on a first winch on board the vessel, said method comprising the steps of:

(a) attaching to a point on the anchored cable adjacent said first winch the free end of a first auxiliary cable which is wound up on a second winch horizontally separated from the first winch by at least a distance substantially equal to a length of the pipe to be laid;

(b) paying out anchored cable from the first winch while winding said first auxiliary cable on the second winch, to move said point of attachment along the vessel for a distance equal to said length of pipe to be laid;

(c) hanging along the anchored cable between said point and the first winch travelling supports carrying the length of pipe to be laid and attaching to the length of pipe a second auxiliary cable wound up on a third winch;

(d) paying out the first auxiliary cable and thereby lowering to a position hanging from the first winch, the anchored cable with the length of pipe supported therealong above said point of attachment;

(e) detaching the first auxiliary cable from the anchored cable and then paying out the second auxiliary cable, thereby lowering said supported length of pipe down the anchored cable to a position adjacent the anchor point or the next previously lowered length of pipe in the sequence;

(f) repeating steps (a) to (e); and moving the vessel forward along the direction of the pipeline for a distance equivalent to the lengths of pipe laid.

2. A method according to claim 1, wherein remotely controlled detachable means is provided, at said point of attachment in step (a), to prevent the length of pipe from proceeding further down the anchored cable while the attachment persists.

3. A method according to claim 1, wherein the lengths of pipe are adapted for mating adjacent lengths in line by fixing to the respective ends of each length a male coupling member and a female coupling member capable of mating with such a male coupling member to form a sealed junction.

4. A method according to claim 3, wherein the male and female coupling members of adjacent pipe lengths are automatically locked together when mated.

5. A method according to claim 1, wherein at least one self-propelled submersible craft equipped with means for handling lengths of pipe is employed at the sea bed to lift, align and couple each length of lowered pipe in turn with the next pipe in the sequence and leave a completely connected string of pipes on the sea bed.

* * * * *